Dec. 9, 1947.　　　W. J. MORRILL　　　2,432,436
PERMANENT MAGNET ROTOR
Filed Sept. 16, 1943

INVENTOR.
Wayne J. Morrill
BY
Hoodling and Kroot
attys.

Patented Dec. 9, 1947

2,432,436

UNITED STATES PATENT OFFICE 2,432,436

PERMANENT MAGNET ROTOR

Wayne J. Morrill, Fort Wayne, Ind.

Application September 16, 1943, Serial No. 502,561

13 Claims. (Cl. 171—209)

My invention relates in general to rotors for dynamo-electric machines and more particularly to rotors having a permanent magnet field.

The operation of a dynamo-electric machine having a rotor constructed of a permanent magnet field is somewhat different from the operation of a conventional excited machine, in that with the conventional dynamo-electric machine the de-magnetization or the cross-magnetization of the rotor is accompanied by no permanent ill effects. On the other hand, a rotor having a permanent magnet field may be seriously affected by the de-magnetization or the cross-magnetization. The cross-magnetization of a permanent magnet field can readily result in a shifting of the poles and consequently a weakening of the magnet and in a permanent reduction in the generated voltage. The de-magnetization of such a field may also permanently reduce the strength of the magnet and reduce the generated voltage. Such reduction is, of course, the equivalent of a reduction in the effective capacity of the machine, the result being that, unless some means for preventing the permanent ill effects of de-magnetization or cross-magnetization is provided, it is necessary to build a considerably larger generator to obtain one having the desired output.

In order to obtain a generator having good voltage regulation characteristics, it is necessary to provide stator windings having relatively low impedance. Such low impedance windings are naturally subject to very heavy currents under over-load and short circuit conditions and a large part of the magnetomotive force produced by the flow of these heavy currents through the stator winding may be applied at right angles to the direction of the permanent magnet flux of the rotor. As a result, the leading pole tip of the rotor is de-magnetized or "knocked down" and, since a trailing pole tip which is subject to over-magnetization is in its original state magnetized as high as possible, the permanent effect of the cross magnetization is to reduce the total flux of the pole and consequently the generated voltage of the dynamo-electric machine.

It is also possible under certain conditions that most of the magnetomotive force produced by heavy currents in the stator windings may become directly opposed to the permanent magnet flux of the rotor, resulting in a permanent reduction of the magnetic flux of the rotor, the end result being a permanent reduction in the generated voltage of the machine.

An object of my invention is to provide an improved rotor for a dynamo-electric machine, which rotor has permanently built-in features which oppose the de-magnetizing of the permanent magnet field of the rotor.

Another object of my invention is the provision of a rotor which will stand a great deal of magnetic abuse without materially de-magnetizing the permanent magnet field.

Another object of my invention is the provision of a permanent magnet type of rotor wherein the permanent magnet is maintained at substantially uniform field strength throughout the major portion of the pole faces of the magnet.

Another object of my invention is the provision of a permanent magnet type of rotor in which there is very little magnetic distortion throughout the pole faces of the rotor under conditions of heavy cross-magnetization.

Another object of my invention is the provision of a permanent magnet type of rotor having flux conducting plates in the region of the pole faces, which flux conducting plates prevent flux of the stator from penetrating the permanent magnet.

Another object of my invention is the provision of a permanent magnet type of rotor having flux conducting plates in the region of the pole faces, which flux conducting plates provide a substantially equipotential surface at the outside of the permanent magnet, thus preventing the disturbing stator space and time harmonics from penetrating to the magnet with consequent demagnetizing action.

Another object of my invention is the provision of a permanent magnet type rotor having windings superimposed on the outer surface of the magnet, which avoids the necessity of slotting the permanent magnet.

Another object of my invention is the provision of closing the winding slots of the rotor with flux conducting wire or material to give the effect of a closed slot rotor construction as well as to give mechanical strength to the rotor so that it may withstand a large amount of centrifugal force.

Another object of my invention is the provision of a distributed winding located in the region of the pole faces of the rotor to serve the dual purpose of reducing pole face distortion and of reducing the fluxes which have a relative speed with respect to the rotor.

Another object of my invention is the provision of a rotor construction having a permanent magnet core, which core is substantially free from external fluxes.

Another object of my invention is the provision of a rotor which is adapted to operate within a stator of a dynamo-electric machine and which rotor, because of its construction, produces in the stator substantially only such fluxes as move with respect to the stator at fundamental speed, thereby eliminating harmonics from the stator voltage wave.

Another object of my invention is the provision of a flux conducting plate disposed between the distributed winding and the pole face surface of the permanent magnet over which the distributed winding is located.

Another object of my invention is the provision of a permanent magnet type of rotor which is simple of manufacture and which will stand a great deal of mechanical abuse and which will maintain its magnetic properties throughout a long period of operation.

Other objects and a fuller understanding of my invention may be had by referring to the following description and claims, taken in combination with the accompanying drawings, in which:

Figure 1:
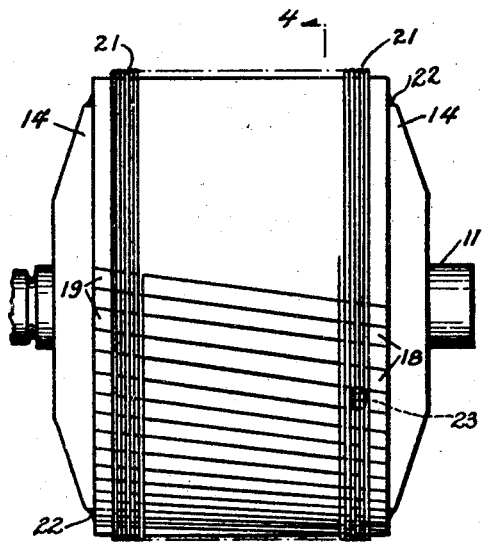
Figure 1 is an elevational view of a rotor embodying the features of my invention.
Figure 2:
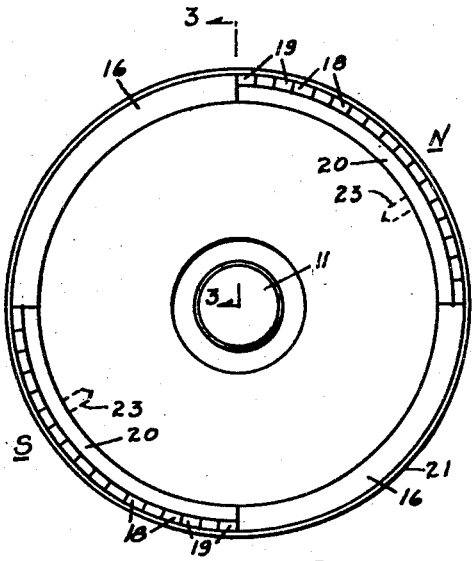
Figure 2 is an end view of the rotor shown in Figure 1.

With reference to the drawing, the permanent magnet field is indicated by the reference character 10 and may be cast or otherwise produced about a shaft 11. The permanent magnet field may be in the form of a solid rotor or core and cast or otherwise suitably made of material which when magnetized has a high magnetic retentivity and which will have the property of maintaining the magnetism over a long period of time. Present materials having this property are extremely hard and brittle.

The windings for my rotor are superimposed externally of the permanent magnet field with the result that with my type of construction there is no need to slot the external surface of the magnet to receive the windings. Such slotting would not only be difficult to perform mechanically, but would also materially weaken the magnet both magnetically and mechanically.

The windings of my rotor comprise a main short circuited turn and a plurality of distributed short circuited auxiliary turns. The main short circuited turn is superimposed on the outer surface of the permanent magnet core 10 intermediate the pole regions of the magnet and the plurality of distributed short circuited auxiliary turns are superimposed on the outer surface of the permanent magnet core 10 in the region of the pole faces. In the drawings I have illustrated two pole faces disposed substantially 180 degrees apart; namely, a south pole which is indicated by the letter S and a north pole which is indicated by the letter N, but it is to be understood that my invention applies equally well to a larger number of pole faces.

The main short circuited turn comprises two arcuate current conductor plates 16 which are superimposed upon the outer angular surface 12 of the permanent magnet 10, taken in combination with end rings 14 which are disposed next adjacent to the ends 13 of the permanent magnet. The current conductor plates 16 and the end rings 14 are preferably constructed of copper in order to provide a minimum short circuited resistance to the flow of current. The ends of the current conductor plates 16 may be suitably connected to the periphery of the end rings 14 in any suitable manner and, as illustrated, I preferably make this connection by brazing or by silver soldering as indicated at 22 to keep the electrical resistance to a minimum. The current conductor plates 16 embrace the outer surface 12 of the permanent magnet intermediate the pole faces.

Figure 3:
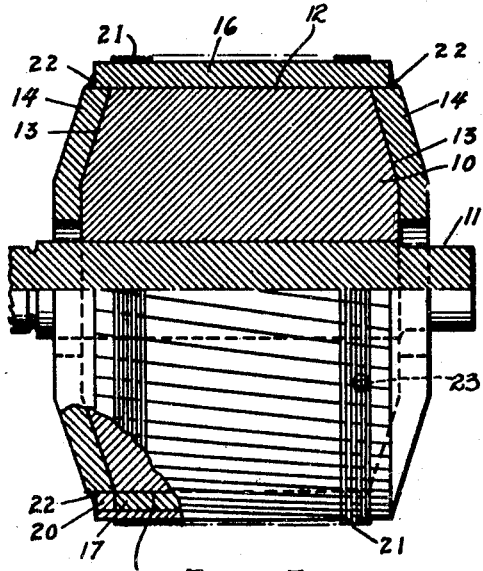
Figure 3 is a sectional view of my rotor taken along the line 3—3 of Figure 2.
Figure 4:
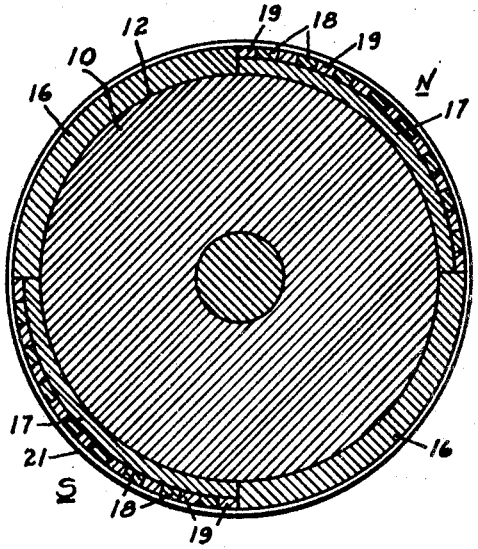
Figure 4 is a cross-sectional view taken along the line 4—4 of Figure 1.

The distributed short circuited auxiliary turns are superimposed on the outer surface of the permanent magnet in the region of the pole faces and comprise a plurality of circumferentially spaced conductor bars 18 having their ends suitably connected such as by brazing to the periphery of the end rings 14. Positioned under the plurality of current conductor bars 18 is an arcuate flux conducting plate 17 which rests against the outer surface 12 of the permanent magnet. Disposed between the circumferentially spaced conductor bars 18 are a plurality of flux conducting bars 19 which are preferably made of soft magnetic material. As shown in the cutaway lower left-hand corner of Figure 3, the sides of the flux conducting plates 17 substantially coincide with the width of the outer surface 12 of the permanent magnet 10. Accordingly, the ends of the current conducting bars 18 and the flux conducting bars 19 extend beyond the sides of the flux conducting plates 17. An end filler 20, which is preferably made of copper, is disposed underneath the extended ends of the current conducting bars 18 and the flux conducting bars 19 and on the outer peripheral edge of the end rings 14. The end fillers 20 are brazed to the outer peripheral edge of the end rings, and the overlapping ends of the current conducting bars 18 and the flux conducting bars 19 are in turn brazed to the end fillers 20.

The combined construction of the end rings 14, the current conducting plates 16, the flux conducting plates 17, the current conducting bars 18, and the flux conducting bars 19 provide a fabricated shell which substantially surrounds the permanent magnet core 10. The brazing heats the fabricated shell to a relatively high temperature and consequently upon cooling it shrinks tight upon the outer surface of the permanent magnet to give a strong structure and to prevent mechanical slippage between the fabricated shell and the permanent magnet 10. As an additional provision against mechanical slippage pins 23, which are anchored to the fabricated shell, may extend into suitable openings or notches in the permanent magnet.

After the fabricated shell is brazed and shrunk upon the permanent magnet core 10 it may then be machined to present a smooth outer peripheral surface. Around the machined outer peripheral surface may be wrapped a flux conducting wire 21 having each end thereof anchored to the fabricated shell to prevent unwinding. Also, in order to prevent the layers of turns of the binding wire 21 from creeping circumferentially, adjacent turns may be soldered together at one or more localized places extending across the face of the fabricated shell. The band wire 21 not only serves to give mechanical strength to the shell so that it may withstand high centrifugal forces, but also to produce a closed slot effect so that as the flux passes out through the flux conducting bars 19 the flux may then distribute itself circumferentially in the turns of wire before passing to the stator. The layer of banding wire 21 constitutes a band of laminated magnetic material and as such prevents the flow of eddy current therein. The layer of banding wire 21 extends substantially across the entire face of the fabricated shell, but in Figures 1 and 3 of the drawing the layers of banding wire 21 are shown removed in the central region in order to illustrate the current conductor bars 18 and the flux conducting bars 19 with full lines in the central region. The flux conducting plates 17 have the property of distributing the flux emanating from the stator so that the flux which emanates from the stator does not penetrate the permanent magnet.

The flux conducting plates 17 have the three-fold purpose of constituting a provision of a path for collecting the flux from the permanent magnet and conducting it to the rotor flux conducting bars 19, the provision of a by-path for the cross-magnetizing stator flux preventing the stator flux from entering the permanent magnet, and the provision of a by-path for higher harmonic fluxes of the stator which might otherwise penetrate to the permanent magnet and magnetically churn its surface. Such magnetic churning has a tendency to demagnetize and thus destroy the effectiveness of the permanent magnet core.

The advantage of the flux collecting action of the flux conducting plates 17 is best appreciated in the light of the characteristics of permanent magnet materials and what is known of their efficient use. Such permanent magnet materials operate efficiently in dynamo-electric machines when the flux density in the permanent magnet itself is uniform throughout the magnet and the density in the magnet is approximately half that which can be induced in the usual soft magnetic materials, of which the flux conducting plates 17 are preferably made. The use of the flux conducting plates 17 tends to establish an equipotential magnetic surface at the poles of the permanent magnet and thus tends to produce a uniform magnetic density in the permanent magnet material. Without the use of the flux conducting plates 17 it would be necessary for the flux of the permanent magnet to concentrate at points in the magnet adjacent to the flux conducting bars 19, thus causing a variation of the magnetic density in the permanent magnet and locally raising the density to a point where the magnetomotive force would be lost in the permanent magnet itself.

The rotor banding wire 21, in addition to its mechanical purpose, serves also as a flux distributing means, causing the flux of the flux conducting bars 19 to be distributed in such fashion that the entire air gap area becomes effective as a flux conducting path and, in addition, the banding wire serves to furnish a conducting path for stator harmonic fluxes giving additional assurance against their penetrating the permanent magnet material.

The current conducting plates 16, together with the current conducting end rings 14, constitute a heavy short circuited winding surrounding the main flux path of the permanent magnet. The purpose of this short circuited winding is to prevent demagnetization of the permanent magnet under transient or short circuit conditions of the stator and it has been determined that the conductivity of this short circuited turn should preferably be approximately equal to or slightly greater than the conductivity of the stator winding when measured with reference to the rotor winding.

If the stator is suddenly short circuited at the time that the rotor flux through it is maximum, the ensuing effects can be understood by use of the well-known principle applying to transients, termed the principle of "constant linkages." According to the principle of constant linkages, the flux linkage in any electro-magnetic structure must remain constant for the first instant following a short circuit because of the induced heavy currents which oppose a change in flux. With this in mind, it will be seen that immediately after a short circuit of the stator at a time approximating maximum rotor flux linkages, the short circuited stator winding will momentarily lock the linked flux in place while the rotor continues to turn first to a position at right angles to the locked flux and then to a position in which the permanent magnet is directly opposed to the locked flux. Under this opposed condition, the tendency would be for the permanent magnet to be directly demagnetized by the heavy reversed magnetomotive force of the stator and the characteristics of the dynamo-electric machine embodying the rotor would be permanently damaged. When a heavy short circuiting turn of conductivity equal to the referred conductivity of the stator winding is introduced around the permanent magnet of the rotor, the currents which are induced in this heavy short circuited turn tend to maintain the rotor flux at a constant value and, as a result, the magnetomotive force of the heavy rotor short circuiting turn opposes and neutralizes the magnetomotive force of the short circuited stator winding, preventing the permanent magnet rotor core from being demagnetized.

In the event that a short circuit should occur in the stator winding when the rotor flux linkages are substantially zero, a transient of a different type will take place because at that time there exists in the stator winding substantially maximum voltage. At this instant of short circuit, the current in the stator winding will rapidly rise and produce a strong stator magnetomotive force which will again have a demagnetizing effect on the rotor. Under certain conditions this last mentioned transient demagnetizing effect might be expected to be less than that occurring when the rotor flux linkages are maximum.

Because of the necessity, as outlined above, of providing a relatively high conductivity in the heavy short circuited winding, the current conducting plates 16 and the end rings 14 are made relatively thick. The thickness of the current conducting plates 16 also renders the air gap large in the region of the plates. Because of the very large air gap no special precautions need to be taken to prevent rotor demagnetization in the region of the current conducting plates other than that effected by the action of the flow of the heavy eddy currents in the plates 16 and the flow of short circuited currents in the fabricated shell which surrounds the region of the conducting plates.

The current conducting bars 18 serve the dual purpose of assisting in preventing the "knockdown" or the permanent weakening of the flux in the leading pole tip under short circuit or transient conditions of the stator winding and reducing the magnitude of the third harmonic of voltage which is inherent in single phase alternators. Oscillographic tests show that by the use of these current conducting bars 18 the voltage wave of the generator closely approximates a sine wave, even under full load, single phase conditions. The current conducting bars 18 assist in preventing permanent distortion or "knock-down" of the permanent magnet flux because of the tendency for each adjacent current conducting bar 18 to maintain in the intermediately disposed flux conducting bar 19 a constant flux under transient conditions.

The fabricated shell which surrounds the permanent magnet core 10 may be assembled and built up around the magnet core or may be constructed as a separate unit in which the permanent magnet core is later mounted therein. In normal operation of the rotor the speed may be of a very high order and the shell affords protection to the permanent magnet core 10 at these very high speeds against the permanent magnet core 10 disrupting due to large centrifugal forces. In other words, the fabricated shell affords safety measure in the event that the permanent magnet core should rupture.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a dynamo-electric machine the improvement of a rotor comprising, a permanent magnet field element, said element having an annular outer surface and two end surfaces, winding means for said field element, said winding means including end rings disposed next adjacent to the end surfaces of the field element and conductors superimposed on said outer annular surface and extending from one end ring to the other, and means for connecting the conductors to the end rings, said conductors comprising two groups, one of said groups having at least two arcuate conductor plates spaced substantially 180 electrical degrees apart, and the other group comprising a plurality of circumferentially spaced conductor bars, said circumferentially spaced conductor bars being superimposed on the said outer surface between the said at least two spaced arcuate conductor plates, and flux conducting bars comprising magnetic material disposed between the plurality of circumferentially spaced conductor bars.

2. In a dynamo-electric machine, the improvement of a rotor comprising, a permanent magnet field element, said element having an annular outer surface and two end surfaces, winding means for said field element, said winding means including end rings disposed next adjacent to the end surfaces of the field element and current conductors superimposed on said outer annular surface and extending from one end ring to the other, and means for connecting the current conductors to the end rings, said current conductors comprising two groups, one of said groups having at least two arcuate current conductor plates spaced substantially 180 electrical degrees apart, and the other group comprising a plurality of circumferentially spaced current conductor bars, at least two arcuate flux conducting plates comprising magnetic material superimposed on the said outer surface of the field element and disposed between the said at least two arcuate current conductor plates, said circumferentially spaced current conductor bars being superimposed on said arcuate flux conducting plates, and flux conducting bars comprising magnetic material disposed between the plurality of circumferentially spaced current conductor bars.

3. In a dynamo-electric machine, the improvement of a rotor comprising, a permanent magnet field element, said element having an annular outer surface and two end surfaces, winding means for said field element, said winding means including end rings disposed next adjacent to the end surfaces of the field element and current conductors superimposed on said outer annular surface and extending from one end ring to the other, means for connecting the current conductors to the end rings, said current conductors comprising two groups, one of said groups having at least two arcuate current conductor plates spaced substantially 180 electrical degrees apart, and the other group comprising a plurality of circumferentially spaced current conductor bars, at least two arcuate flux conducting plates comprising magnetic material superimposed on the said outer surface of the field element and disposed between the said at least two arcuate current conductor plates, said circumferentially spaced current conductor bars being superimposed on said arcuate flux conducting plates, flux conducting bars comprising magnetic material disposed between the plurality of circumferentially spaced current conductor bars, and flux conducting material surrounding the said current conductor plates and bars and the said flux conducting bars.

4. In a dynamo-electric machine, the improvement of a rotor comprising a permanent magnet field element, said element having an annular outer surface with a first pole region and a second pole region, a main short circuited turn surrounding said field element and having arcuate current conductor plates superimposed on said outer surface of the field element intermediate said first and second pole regions and a plurality of distributed short circuited auxiliary turns having circumferentially spaced conductor bars superimposed on said outer surface of the field element in the first and second pole regions, and flux conducting bars comprising magnetic material disposed between the plurality of circumferentially spaced conductor bars.

5. In a dynamo-electric machine, the improvement of a rotor comprising a permanent magnet field element, said element having an annular outer surface with a first pole region and a second pole region, arcuate flux conducting plates superimposed on said outer surface of the field element in the first and second pole regions, winding means for said field element, said winding means including a plurality of distributed short circuited auxiliary turns including circumferentially spaced conductor bars superimposed on said flux conducting plates, and flux conducting bars comprising magnetic material superimposed on said arcuate flux conducting plates and disposed between the plurality of circumferentially spaced conductor bars.

6. In a dynamo-electric machine having a stator, the improvement of a rotor comprising a permanent magnet field element, said element having pole surface regions and interpole surface regions, first winding means mounted on said pole surface regions, second winding means mounted on said interpole surface regions, flux conducting means in association with said first winding means on said pole surface regions to provide a by-path for the cross-magnetizing stator flux and thereby prevent stator flux from entering the permanent magnet field element, said second winding means comprising a greater cross-sectional area than the first winding means and effecting a short circuit about the main flux path of the permanent magnet field element and thereby preventing demagnetization thereof, said second winding means effecting a greater non-magnetic gap between the rotor and stator at the interpole surface regions than that effected by the first winding means at the pole surface regions.

7. In a dynamo-electric machine having a stator, the improvement of a rotor comprising, a permanent magnet field element having pole surface regions and interpole surface regions, winding means mounted on said surface regions, said winding means comprising two portions, one of said portions including a distributed winding and the other of said portions including at least a heavy short circuited winding to prevent demagnetization of the permanent magnet field element, said at least heavy short circuited winding including a plurality of plate members mounted on the interpole surface regions, said plate members having end connections to complete the heavy short circuited winding, said distributed winding including a plurality of circumferentially spaced bars, said spaced bars having end connections for producing a plurality of distributed short circuited turns, and flux conducting means in association with said circumferentially spaced bars on said pole surface regions to provide a by-path for the cross-magnetizing stator flux and thereby prevent stator flux from entering the permanent magnet field element, said heavy short circuited winding on said interpole surface regions effecting a greater non-magnetic gap between the rotor and stator at the interpole surface regions than that effected by the distributed winding at the pole surface regions.

8. In a dynamo-electric machine having a stator, the improvement of a rotor comprising, a permanent magnet field element having pole surface regions and interpole surface regions and having two end surfaces, winding means for said field element, said winding means including end rings disposed next adjacent to the end surfaces of the field element and conductor members mounted on said pole surface regions and on said interpole surface regions, said conductor members extending from one end ring to the other and having their ends connected to said end rings, and flux conducting means mounted on said pole surface regions and at least underneath a portion of said conductor members, said remaining conductor members being disposed next adjacent to the interpole surface regions and being included in a short circuited turn to prevent demagnetization of the permanent magnet field element, said remaining conductor members having a greater cross-sectional area than the conductor members mounted on said pole surface regions and effecting a greater non-magnetic gap between the rotor and stator at the interpole surface regions than that effected by the said conductor members at the pole surface regions.

9. In a dynamo-electric machine having a stator, the improvement of a rotor comprising, a permanent magnet field element having pole surface regions and interpole surface regions and having two end surfaces, winding means for said field element, said winding means including end rings disposed next adjacent to the end surfaces of the field element and conductor members mounted on said pole surface regions and on said interpole surface regions, said conductor members extending from one end ring to the other and having their ends connected to said end rings, said conductor members comprising two groups, one of said groups having at least two plate members spaced substantially 180 electrical degrees apart and mounted on said interpole surface regions, and the other group comprising a plurality of circumferentially spaced conductor bars mounted on said pole surface regions, and flux conducting means mounted on said pole surface regions in association with said spaced conductor bars to provide a by-path for the cross-magnetizing stator flux and thereby prevents stator flux from entering the permanent magnet field element, said conducting plate members being included in a short circuited turn to prevent demagnetization of the permanent magnet field element and having a greater cross-sectional area than the conductor bars, said plate members effecting a greater non-magnetic gap between the rotor and stator at the interpole surface regions than that effected by the spaced conductor bars at the pole surface regions.

10. In a dynamo-electric machine having a stator, the improvement of a rotor comprising, a permanent magnet field element having pole surface regions and interpole surface regions and having two end surfaces, winding means for said field element, said winding means including end rings disposed next adjacent to the end surfaces of the field element and conductor members mounted on said pole surface regions and on said interpole surface regions, said conductor members extending from one end ring to the other and having their ends connected to said end rings, and flux conducting means mounted on said pole surface regions and at least underneath a portion of said conductor members, said remaining conductor members being disposed next adjacent to the interpole surface regions and being included in a short circuited turn to prevent demagnetization of the permanent magnet field element, said remaining conductor members having a greater cross-sectional area than the conductor members mounted on said pole surface regions and effecting a greater non-magnetic gap between the rotor and stator at the interpole surface regions than that effected by the said conductor members at the pole surface regions, and a flux conducting wire wound around said conducting members.

11. In a dynamo-electric machine having a stator, the improvement of a rotor comprising, a permanent magnet field element having a first pole region and a second pole region, a main short circuited turn surrounding said field element intermediate said first and second pole regions, and a plurality of distributed short circuited auxiliary turns having circumferentially spaced conductor bars mounted on said first and second pole regions, said main short circuited turn having a conductivity which is substantially at least as great as the referred conductivity of the stator.

12. In a dynamo-electric machine having a stator, the improvement of a rotor comprising, a permanent magnet field element having a first pole region and a second pole region, a main short circuited turn surrounding said field element intermediate said first and second pole regions, flux conducting means mounted on said first and second pole regions, and a plurality of distributed short circuited auxiliary turns having circumferentially spaced conductor bars mounted on said flux conducting means, said main short circuited turn having a conductivity which is substantially at least as great as the referred conductivity of the stator.

13. In a rotor for a dynamo-electric machine, an improvement comprising a permanent magnet rotor core having pole surface regions and interpole surface regions, a shell substantially surrounding said core, said shell including flux conducting segmental pieces mounted on said pole surface regions and current conducting segmental pieces mounted on the interpole surface regions, the ends of said segmental pieces being adjacent to each other and forming said shell, said current conducting segmental pieces being substantially at least as thick in a radial direction as the flux conducting segmental pieces, and a plurality of peripherally spaced conductor bars mounted in the said flux conducting segmental pieces, said plurality of conducting bars having end connections to provide short circuited turns.

WAYNE J. MORRILL.

REFERENCES CITED

The following references are of record in the file of this patent:

UNITED STATES PATENTS

| Number | Name | Date |
| --- | --- | --- |
| 2,078,805 | Merrill | Apr. 27, 1937 |
| 2,159,768 | Macmillian | May 23, 1939 |
| 459,923 | Beattie | Sept. 22, 1891 |
| 876,949 | Dickerson | Jan. 21, 1908 |
| 1,798,571 | Walther | Mar. 31, 1931 |
| 2,072,894 | Lilja | Mar. 9, 1937 |
| 2,279,402 | Japolsky | Apr. 14, 1942 |
| 2,303,893 | Mullner | Dec. 1, 1942 |